United States Patent [19]
Fishler et al.

[11] Patent Number: 5,151,201
[45] Date of Patent: Sep. 29, 1992

[54] PREVENTION OF EROSION AND ALUMINA BUILD-UP IN CASTING ELEMENTS

[75] Inventors: Mark K. Fishler, DuPage County; Gilbert Rancoule, Beaver County, both of Ill.; Han K. Park; Quentin K. Robinson, both of Allegheny County, Pa.

[73] Assignee: Vesuvius Crucible Company, Pittsburgh, Pa.

[21] Appl. No.: 638,049

[22] Filed: Jan. 7, 1991

Related U.S. Application Data

[63] Continuation-in-part of Ser. No. 477,850, Feb. 12, 1990, Pat. No. 5,060,831.

[30] Foreign Application Priority Data

Jul. 1, 1988 [FR] France .................... 8808945

[51] Int. Cl.[5] .............................................. B22D 41/08
[52] U.S. Cl. .................................. 222/600; 266/236; 266/275
[58] Field of Search ............... 222/600, 607, 606, 591; 266/236, 275; 501/104

[56] References Cited

U.S. PATENT DOCUMENTS

| | | | |
|---|---|---|---|
| 4,691,844 | 8/1987 | Ishino et al. | 222/591 |
| 4,849,383 | 7/1989 | Tanemura et al. | 501/104 |
| 4,870,037 | 9/1989 | Hoggard et al. | 301/97 |
| 4,913,408 | 4/1990 | Hoggard et al. | 266/280 |
| 4,989,762 | 2/1991 | Ando et al. | 501/104 |

FOREIGN PATENT DOCUMENTS

| | | |
|---|---|---|
| 0135482 | 3/1985 | European Pat. Off. |
| 0242849 | 10/1987 | European Pat. Off. |
| 985427 | 3/1951 | France |
| 2007089 | 1/1970 | France |
| 2529540 | 6/1983 | France |

OTHER PUBLICATIONS

Patent Abstracts of Japan, vol. 12, No. 343 63-104761, Tokyo Yogyo Co. Ltd. Dec. 1988.
Patent Abstracts of Japan, vol. 12, No. 381 63-132755, Kawasaki Refract Co. Ltd. Dec. 1988.

*Primary Examiner*—Scott Kastler
*Attorney, Agent, or Firm*—Webb, Burden, Ziesenheim & Webb

[57] ABSTRACT

The invention concerns a material for covering the metal contacting surfaces of casting elements such as slide gate valves and casting nozzles and shrouds to resist steel erosion and alumina deposition during the continuous casting of aluminum killed steel.

It is comprised of a fused mixture of calcium oxide and zirconia, with a calcium oxide content of between about 20% and about 60% by weight and preferably between about 20% and about 50% by weight, the composition may include a binder producing carbon/carbon bonds by sintering. The material may also include a ceramic bond or may be applied as a fused layer by plasma spraying.

7 Claims, 1 Drawing Sheet

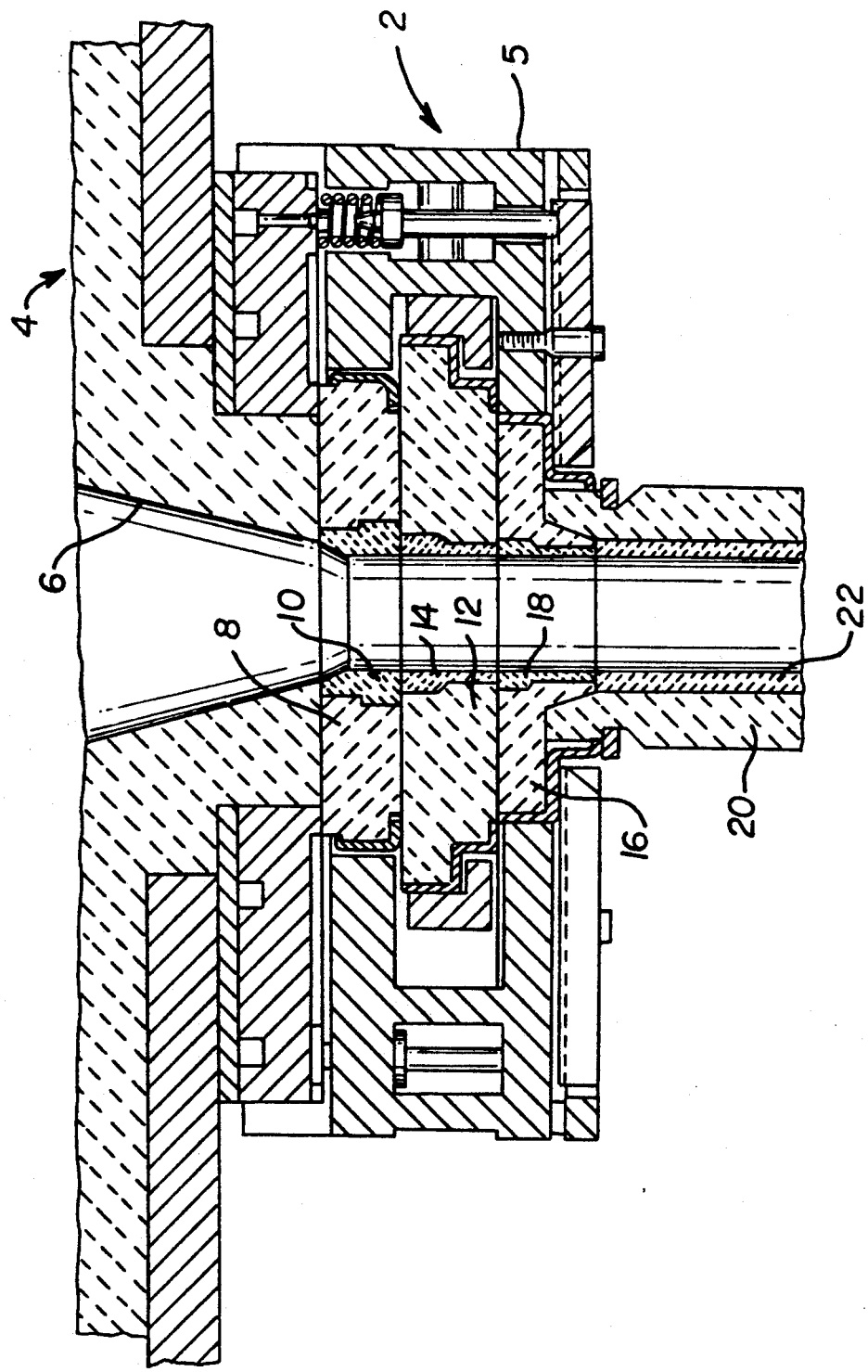

PREVENTION OF EROSION AND ALUMINA BUILD-UP IN CASTING ELEMENTS

CROSS-REFERENCE TO RELATED APPLICATIONS

This is a continuation in part of co-pending U.S. Patent application Ser. No. 07/477,850, filed Feb. 12, 1990, now U.S. Pat. No. 5,060,831 entitled "Material For Covering A Casting Shroud".

BACKGROUND OF THE INVENTION

The present invention relates generally to the casting of molten metals and, more particularly, to the refractory elements used to control the flow of molten steel during continuous casting operations, for example.

One important object of the present invention is to provide a new material for the molten metal contacting surfaces of casting elements. More particularly, it concerns casting elements such as slide gate valves and nozzles for casting aluminum killed steels or ferro-alloys containing aluminum.

Following the ore smelting operations and iron-into-steel conversion, the metal contains non-negligible amounts of dissolved oxygen. This oxygen is quite pernicious, notably during casting operations and in general working of the metal. In order to suppress this dissolved oxygen, calming agents are employed. Among the latter, silicon, carbon, magnesium and aluminum are commonly used agents. It is primarily this latter metal, aluminum, alloyed or not, that is used to "kill" or calm steels, since it provides the most effective results.

Nevertheless, during casting operations, for reasons and under conditions that are still poorly known, fine particles of alumina accumulate in the casting shrouds, e.g., such as the nozzles, capable of causing an almost total blockage and a definite problem in the normal development of the casting systems. It is further noted that alumina may also deposit on the orifices of the slide gate valve through which molten metal is teemed from the tundish, for example. Such alumina deposition causes unwanted variations in the flow rate of the molten steel and may also result in eventual total blockage of the valve.

In order to alleviate these difficulties, an initial solution consists in frequently changing the casting elements where alumina accumulates. This solution is expensive and considerably shortens the service life of the casting elements, notably the nozzles which convey the metal emerging from the distributor in the case of continuous casting.

In order to increase the service life of the casting elements, another solution consists in reducing the amount of aluminum to be added as much as possible. This palliative method is however not satisfactory.

At the beginning of the 1980's, studies conducted by Emilio Marino and Aldo Ramacciotti led to the French patent published under U.S. Pat. No. 2,529,540. It is indicated in this document that it is possible to avoid any accumulation of alumina in the nozzles, since these latter are produced from lime, if necessary, with some additive elements. These elements, the sum of which is between 3% and 25% by wt., are designed to promote the growth of the grains.

This technique, which definitely gives good results with regard to the accumulation of alumina grains, has a major shortcoming, that of the necessary precautions in the storage and transport of these nozzles. In effect, such a refractory material, comprised for the most part, even up to 100%, of unhydrated lime, is extremely reactive with respect to humidity, which results in a loss of mechanical strength when such a casting element has been subjected to moisture.

A further prior approach to solve this problem has been taken in which the parts of the casting elements in contact with the molten metal are covered with a mineral layer that forms eutectics having a low melting point with alumina. These eutectics are washed and entrained with the alumina by the flowing of the molten metal. While this technique provides a substantial improvement as compared with the existing techniques, it replaces the accumulation of alumina with an erosion of the alumina anti-accumulation layer, which also reduces the service life of the casting elements.

Use of composite material of the SiAlON type offers a significant advance (cf. D. B. Hoggard, G. I. Rancoule, L. C. Myers, H. K. Park, and M. K. Fishler, "Development of a Liner to Reduce Alumina Buildup in Graphitized Alumina Submerged Pouring Nozzles Used in The Continuous Casting of Steel", published at the Second International Conference on Refractory Materials, "Refractories '87, TOKYO, Japan, Nov. 10–13, 1987"), but not a decisive one. U.S. Pat. No. 4,870,037 of D. B. Hoggard and H. K. Park also discloses a continuous casting nozzle having a liner insert of a SiALON-graphite refractory material for prevention of alumina build-up.

One of the purposes of the present invention is to provide a material for at least the metal contacting surfaces of the casting elements to avoid erosion and alumina accumulation. The present invention thus provides casting elements such as slide gate valves in which erosion due to molten metal is minimized and the accumulation of alumina is difficult, if not impossible.

In addition, the present invention provides a casting process for ferro-alloys killed with aluminum or with one of its alloys, such as the aluminum/magnesium alloys which utilizes the said casting elements.

These, as well as other advantages, are achieved by means of a material for covering the casting elements, characterized by the fact that it has a calcareous composition capable of liberating calcium oxide, under the conditions of use, at a temperature at least equal to 1400° C. due to the fact that its calcium content, expressed in weight percent of calcium oxide, is between about 10% and about 60% and preferably between about 20% and about 50% and due to the fact that the said calcareous composition is bound by means of a binder chosen among the group comprised of those utilizing bonds of the carbon/carbon type by sintering. The material may also have a ceramic bond or may be applied as a fused coating by plasma spraying to the metal contacting surfaces of the casting elements.

During the study that was conducted on the present invention, it was in effect demonstrated that with such a composition, during the casting of a ferro-alloy killed with aluminum or with one of its alloys, such as the aluminum/magnesium alloys, a layer of an eutectic or an eutectoid mixture, the alumina/calcium oxide ratio of which is in the vicinity of 6:1, developed in contact with the metal rich in aluminum. This layer has the surprising property of playing an anti-adhesive role with respect to alumina and an adhesive role with respect to the basic material, perhaps due to the affinity of the latter for calcium. Thus, this layer prevents any accumulation of alumina and by remaining fixed on the casting element itself protects the latter from wear by entrainment with the casting of steel or ferro-alloy.

Thus, after the first casting, provided the ferro-alloy was sufficiently rich in aluminum, the faces in contact with the ferro-alloy that are covered with the said material become covered at least partially with a composition that can be qualified as an eutectoid and whose alumina/unhydrated lime molar ratio is in the vicinity of 6:1.

The host material of the calcium, generally in the form of oxide, should preferably have a sufficient affinity for the lime to assure its stability, even in a relatively humid atmosphere, i.e., that it should avoid a phenomenon abundantly described in the literature of thermodynamic reactions between oxidized products and water, according to which the reaction of formation of slaked lime is a very strongly exothermic reaction of hydration of the unhydrated lime, this reaction being followed by a considerable volumetric swelling (capable of breaking physical bonds by expansion).

The host material should also have the property of being sufficiently little bound to the unhydrated lime and of liberating the latter sufficiently during casting, so that it can combine with alumina and form, possibly with various other impurities, an interfacial phase that can be qualified as an eutectoid.

The host material and the calcareous composition should be refractory at the casting temperature. The calciferous composition should be as homogeneous as possible in the particular range and is preferably realized by melting or by reaction in the solid state of the host material with a calcium compound such as quick lime.

The host material can be used either pure or in the presence of controlled amounts of additive elements.

SUMMARY OF THE INVENTION

The model and best representative of the host material is zirconia ($ZrO_2$). Thus, the calciferous composition preferably contains zirconia ($ZrO_2$), advantageously in a proportion varying from 40% to 85% (by weight) and calcium oxide in a proportion varying from 15 wt. % to 60 wt. %, preferably between about 23 wt. % and 50 wt. %. These proportions do not take into account the binding agents used to assure cohesion of the material. The element can be made either in a single block or piece by isostatic pressing, followed by the formation of bonds by hot sintering, or in the form or by means of an insert. The element itself and the insert can be sintered separately. It is also possible to sinter one of the two pieces first and then re-sinter the whole to assure a better cohesion between the pieces. However, this solution presents the disadvantages of being relatively costly, whatever technical interest it may have otherwise. The material can also be applied by plasma spraying as a fused layer to the metal contacting surfaces of the casting element.

These elements are produced by a known technique chosen from the group comprised of isostatic pressing, uniaxial pressing, vibrocasting or casting, followed by a sintering in a reducing atmosphere in order to create a carbon/carbon or ceramic bond for the entire element.

The part of the casting element that is not comprised of the said material is produced by known techniques and materials. In particular, it can be made from compounds of alumina and/or zirconia, of the type commonly used in these metallurgical applications.

The present invention is particularly suitable for the production of slide gate valves and casting nozzles for the delivery of aluminum-killed ferrous alloy from a tundish to a continuous casting device.

The present invention also envisions a continuous casting process for ferro-alloy killed with aluminum or one of its alloys, characterized in that the said casting elements are covered with the material on their molten metal contacting surfaces to avoid erosion as well as the striction phenomena due to the deposit of alumina in the casting elements.

During this process, a layer of alumina/calcium oxide eutectoid compounds in a ratio close to 1:6 is formed during the casting, this latter occurring at a temperature above 1400° C.

In the numbers above, the zeros are not significant numbers, but serve simply to fix the position of the significant numbers.

Although reference was made only to ferro-alloys as well as steels in the present specification, the present invention can be applied to the casting of any liquid metal during which there is the risk of an accumulation of alumina.

BRIEF DESCRIPTION OF THE DRAWING

The drawing figure is a cross sectional, side elevation view of a slide gate valve having refractory inserts of the present invention therein.

DETAILED DESCRIPTION OF THE INVENTION

The following nonlimiting examples will provide a better understanding of the details of the present invention.

EXAMPLES 1-4

A covering material according to the present invention was produced from molten zirconia stabilized with calcium oxide with various percentages of molten calcium oxide. The operating method employed is as follows:

The fused zirconia-calcium oxide material was then preliminarily blended with graphite and organic and mineral adjuvants designed to give it the properties suitable for its use during the casting of steels (including: resistance to oxidation, plasticity during shaping, mechanical strength, etc.). The materials are shaped by copressing the refractory compositions according to the geometry desired for the casting nozzle. The piece then undergoes the firing cycles required for achieving the carbon bond, which imparts its specific properties to the material. The products can be machined or not, depending on their application.

The compositions of the various covering materials are indicated in Table I below and the physical properties of the new anti-accumulation layer are given in Table II.

TABLE I

| Composition of anti-alumina layers | Ex. 1 | Ex. 2 | Ex. 3 | Ex. 4 |
|---|---|---|---|---|
| Granular molten zirconia* (14% CaO) | 48.6 | 44.7 | — | — |
| Fine molten zirconia* (14% CaO) | 25.7 | 23.6 | — | — |
| Granular molten zirconia* (26% CaO) | — | — | 47.9 | 44.2 |

TABLE I-continued

| Composition of anti-alumina layers | | | | |
|---|---|---|---|---|
| | Ex. 1 | Ex. 2 | Ex. 3 | Ex. 4 |
| Fine molten zirconia* (26% CaO) | — | — | 25.3 | 23.4 |
| Graphite | 11.9 | 16.4 | 11.7 | 16.2 |
| Metallic silicon | 3.6 | 3.3 | 3.5 | 3.3 |

*Product commercialized by Cookson Industries.

TABLE II

PHYSICAL PROPERTIES OF THE ANTI-ACCUMULATION LAYER

| Example | Apparent volumetric mass g/cm$^3$ | Apparent density | Porosity % | Mechanical strength kg/cm$^2$ | | Class for alumina accumulation | Erosion problem | Coefficient of thermal expansion ($\times 10^{-6}$ C.) |
|---|---|---|---|---|---|---|---|---|
| | | | | Horiz. modulus of rupture | Vert. modulus of rupture | | | |
| 1 | 3.22 | 4.05 | 20.5 | 86 + 13 | 64 + 5 | 2.7 | No | 5.73 |
| 2 | 3.16 | 3.78 | 16.4 | 122 + 14 | 93 + 6 | 2.3 | No | 5.00 |
| 3 | 3.21 | 3.84 | 16.3 | 139 + 9 | 110 + 2 | 2.0 | No | 6.17 |
| 4 | 3.09 | 3.64 | 15.1 | 127 + 9 | 106 + 2 | 1.8 | No | 4.70 |

With reference to the drawing, a slide gate valve 2 is shown in an installed condition on the bottom of a tundish 4. The valve 2 is positioned beneath a teeming opening 6 formed in the well block of the tundish 4 in a manner well-known in the art of steel making. A slide gate valve of this general type is disclosed in U.S. Pat. No. 4,545,512, to Shapland et al. The valve 2 includes a metal frame 5 which is attached to the tundish and holds an upper stationary refractory plate 8, a moveable intermediate refractory plate 12 and a lower refractory place 16. The refractory plates 8, 12 and 16 each have an orifice formed therethrough such that when the orifices are brought into axial registry as shown in the drawing, the gate is fully open, allowing molten steel to flow from the tundish 4 to a continuous casting mold (not shown) positioned beneath a nozzle 20. The flow of molten metal is controlled by sliding movement of the intermediate plate 12 which causes the orifices to become axially offset to a position when the gate is closed.

The ceramic/refractory plates 8, 12 and 16 of the slide gate valve 2 each have an annular insert 10, 14 and 18 respectively formed of the material of the invention and positioned around the pouring orifice in each. The nozzle or casting element 20 contains a liner insert 22 also formed of the fused and sintered calcia-zirconia material of the present invention. Instead of employing the inserts, the entire plate can be constructed of the calcia-zirconia material if so desired. In either case, the material has been found to resist steel erosion and has been effective in minimizing or eliminating the formation of alumina deposition on the metal contacting surfaces of the orifices during casting of aluminum killed steel.

The slide gate plates 8, 12 and 16 or the inserts 10, 14 or 18 are made from a two-phase refractory material consisting essentially of a fused mixture of fully calcia stabilized zirconia of a cubic crystal structure (cubic $ZrO_2$) and calcium zirconate ($CaZrO_3$) The material is formed from a liquid state fusion of between about 10 and 50 wt. % calcia (CaO) and preferably 20 to 50 wt. % CaO, balance zirconia ($ZrO_2$) For example, a mixture of zirconium silicate may be mixed with excess lime and the mixture is melted. The silica is fumed off and the desired $CaO-ZrO_2$ fusion is obtained, for example containing 28 wt. % CaO. Upon cooling to a solid state, a characteristic microstructure is formed whereby at least two separate, yet contiguous phases are formed. This microstructure is referred to as an eutectic or cellular type and is considered to be an essential feature of the present invention. A third phase may also exist, typically as an amorphous, glassy grain boundary type phase within the eutectic mixture. The two primary phases, thus, consist of (a) fully calcia stabilized zirconia (cubic) containing about 10-16 wt. % CaO and (b) calcium zirconate ($CaZrO_3$).

The fused, two-phase material is cooled and frozen to size by appropriate chilling techniques or by crushing and sizing to obtain particle fractions of desired sizes for later pressing into shapes and firing or for plasma spraying as a surface coating. The pressed and fired refractory material may be either oxide based or contain carbon and graphite to obtain either a refractory bond or a carbon bond in the as-fired condition.

The high calcia zirconia, two-phase material may be used entirely alone or it may be blended with other constituents comprising one or more materials selected from the group consisting of badeyelite, also known as monoclinic zirconia or unstabilized zirconia (up to 97 wt. %); partially stabilized zirconia (up to 99 wt. %); fully stabilized zirconia (up to 99 wt. %); zircon or zirconium silicate (up to 99 wt. %); sintering aid (up to 20 wt. %); high lime zirconia (3-100 wt. %); graphite (up to 50 wt. %); and carbon (up to 30 wt. %).

The refractory composition can be either oxide based or contain carbon and graphite. The latter is typically referred to as a carbon bonded system. An alternate form of fabrication is to plasma spray the refractory composition (oxide based) on the working surfaces of the casting elements.

For the oxide refractory compositions, different particle size fractions are typically combined. The particle size fractions are typically coarse (US mesh 8 and finer) and fine (US mesh 325 and finer) although fractions larger, finer, and between these typical ranges are also commonly used. Any number of sintering additives may be added to enhance sintering. The sintering aids that can be used are not limited to the following: $SiO_2$, $TiO_2$, $Y_2O_3$, or any number of other rare earth oxides, and MgO. The refractory composition can also be primarily composed of fine particle size fractions and a sintering aid. The term technical ceramics can also be used to describe these refractory compositions when fine particle size fractions are used. The fine particle size fraction compositions are typically formed to give unfired densities in the range of 50 to 65% of theoretical density and corresponding linear shrinkages on firing of 5% to 20% are obtained (densities in the range of 75% to 100% of theoretical density). A body is formed from any type of composition listed above by any one of many common ceramic forming techniques. The body is then fired to a high temperature, between 1300° C. and 1800° C., to give a strong body capable of resisting mechanical strain and liquid steel erosion.

The carbon bond in the carbon bonded system can be derived from phenolic resin or pitch. For the carbon bonded graphite containing system, the combination of particle size fractions are prepared similarly to what has been described above for the oxide based refractory compositions. Typically, a phenolic resin is combined with the graphite and oxide materials and mixed to give a homogeneous material which can be formed into desired shapes by common ceramic forming techniques. After forming, the carbon bonded refractory piece can be fired to between 800° C. to 1600° C. to develop the carbon bonding phase. It is not necessary to fire the refractory, however. The typical carbon bonded refractory composition will contain 0-20% carbon bond, 0-30% graphite, 10-90% high lime zirconia, and 10-20% of other components like $SiO_2$, Si, Al, SiC, or other antioxidants or sintering aids.

An example of where the high lime refractory composition would be applied to a slide gate plate or slide gate insert is shown in the drawing. The plasma coated refractory composition is similar to the oxide based compositions described above with one main difference: particle size. The plasma coated particle size distribution is typically −200 US mesh / +325 US mesh although variations from this classification can be used. The refractory compositions are then plasma sprayed onto the working surfaces of an existing slide gate or slide gate insert.

EXAMPLE

The composition is formed and fired into the desired shape of a slide gate plate. Typical composition and physical properties of the plate are given in Table III. An example of how the plate is used in service is schematically depicted in the drawing figure.

TABLE III

|  | A | B | C |
| --- | --- | --- | --- |
| Composition | | | |
| Partially stabilized zirconia grain | 44% | — | — |
| High lime zirconia grain | — | 44% | 50% |
| Partially stabilized zirconia fines | 36.5% | — | — |
| High lime zirconia fines | 19.5% | 56% | 49% |
| Sintering aid | — | — | 1% |
| Physical Properties | | | |
| Porosity (%) | 18.2 | 17.4 | 18.0 |
| Apparent specific gravity (g/cc) | 5.41 | 4.70 | 4.67 |
| Bulk density (g/cc) | 4.43 | 3.89 | 3.83 |
| Modulus of rupture (psi) | 2,000 | 5,000 | 4,500 |

We claim:

1. In a slide gate for teeming molten metal from a ladle, tundish or like metallurgical vessel comprising at least one stationary ceramic plate with an orifice therein and at least one movable ceramic plate with an orifice therein such that when the orifices are brought into registry, the gate is open and when the orifices are offset, the gate is closed; the improvement comprising at least one of the ceramic plates comprising:

a shape having said orifice therein and adapted to resist oxide build-up during casting operations, said shape prepared from a batch consisting essentially of fused grains analyzing 20 to 50 percent by weight CaO and the remainder $ZrO_2$ and incidental impurities, said batch formed into said shape and sintered at elevated temperatures to form an oxide bonded structure.

2. The improvement according to claim 1 wherein the shape is prepared from a batch including sintered ceramic grains selected from the group comprising:
unstabilized zirconia, up to 97 wt. %;
partially stabilized zirconia, up to 99 wt. %;
fully stabilized zirconia, up to 99 wt. %;
high lime zirconia, 3 to 100 wt. %; and
zircon, up to 99 wt. %.

3. The improvement according to claims 1 or 2 wherein the shape is prepared from a size graded batch having a coarse fraction and a fines fraction and wherein the fines fraction is comprised entirely of the fused grain.

4. In a slide gate for teeming molten metal from a ladle, tundish or like metallurgical vessel comprising at least one stationary ceramic plate with an orifice therein and at least one movable ceramic plate with an orifice therein such that when the orifices are brought into registry, the gate is open and when the orifices are offset, the gate is closed; the improvement comprising at least one of the ceramic plates comprising:

a shape having said orifice therein and adapted to resist oxide build-up during casting operations, said shape consisting of carbon and a homogeneous fused mixture of calcium oxide and zirconium oxide, said fused mixture consisting essentially of in weight percent between about 20 to about 50 percent calcium oxide and between about 50 to about 80 percent zirconium oxide.

5. The improvement according to claim 4 wherein the shape is prepared from a batch including ceramic grains selected from the group comprising:
unstabilized zirconia, up to 97 wt. %;
partially stabilized zirconia, up to 99 wt. %;
fully stabilized zirconia, up to 99 wt. %;
high lime zirconia, 3 to 100 wt. %; and
zircon, up to 99 wt. %.

6. The improvement according to claims 4 or 5 wherein the shape is prepared from a batch including up to 50 percent by weight grains of graphite or up to 30 percent by weight of carbon.

7. In a slide gate for teeming molten metal from a ladle, tundish or like metallurgical vessel comprising at least one stationary ceramic plate with an orifice therein and at least one movable ceramic plate and an orifice therein such that when the orifices are brought into register, the gate is open and when the orifices are offset, the gate is closed; the improvement comprising at least one of the ceramic plates comprising:

a ceramic shape having said orifice therein and adapted to resist build-up of oxides during casting, said orifice coated with a plasma sprayed coating of a fused mixture consisting essentially of 20 to 50 percent by weight CaO and the remainder $ZrO_2$ and incidental impurities.

* * * * *

UNITED STATES PATENT AND TRADEMARK OFFICE
CERTIFICATE OF CORRECTION

PATENT NO. : 5,151,201
DATED : September 29, 1992
INVENTOR(S) : Mark K. Fishler, Gilbert Rancoule, Han K. Park and Quentin K. Robinson It is certified that error appears in the above-identified patent and that said Letters Patent is hereby corrected as shown below:

Cover page, under Foreign Application Priority Data
    insert --PCT/FR89/00337 [FR] France 6/1989--.

and after [75] Inventors: "Ill." should read --Pa.--.

Column 5 Line 61 after "$(CaZrO_3)$" insert --.--.

Column 5 Line 64 after "$(ZrO_2)$" insert --.--.

Claim 7 Line 57 Column 8 "register" should read --registry--.

Signed and Sealed this

Eighth Day of February, 1994

Attest:

BRUCE LEHMAN

*Attesting Officer*   Commissioner of Patents and Trademarks